Patented June 3, 1952

2,599,391

UNITED STATES PATENT OFFICE 2,599,391

INTERFACE MODIFIERS AND METHOD OF PREPARING SAME

Morris Katzman, Los Angeles, Calif., assignor to Process Chemicals Company, Los Angeles, Calif., a corporation of California No Drawing. Application November 29, 1950, Serial No. 198,250

19 Claims. (Cl. 260—401)

The present invention relates to interface modifier compositions and methods of preparing same.

More specifically, this invention relates to compositions comprising the reaction products of higher fatty acids or other acylating compounds, hydroxy alkyl amines and polybasic acids having at least one hydrogen substituted by a hydrophobic organic radical and having at least one free acidic hydrogen. The products produced in accordance with my invention can be employed as emulsifying, dispersing and wetting agents. My products can be varied so as to be suitable for use in oil or aqueous phase by selecting the molar ratios of the reactants.

The following examples are illustrative embodiments of my invention, all parts being given by weight.

Example I (A) 116.5 parts of chlorosulfonic acid were slowly added to 186 parts of technical lauryl alcohol. The mixture was stirred and cooled from about 25 to about 40° C. HCl was evolved during the reaction and 266 parts of lauryl acid sulfate was produced.

(B) 660 parts of coconut oil were mixed with 630 parts of diethanol amine mixture, were well stirred and heated from 150 to 160° C. and held at this temperature for 4 hours. The reaction product was tested by titration and found to contain 313 parts of a basic constituent which was 24.3% of the total weight. The reaction product was then cooled to about 40 to 50° C. and the lauryl acid sulfate as made under (A) above was slowly added with good stirring. The temperature rose to about 100° C.

The final reaction product was a semi-viscous medium brown colored liquid which turned to a jelly-like consistency on cooling to room temperature. The reaction product had excellent foaming and detergent properties. 0.1% by weight of this product reduced the surface tension of water to less than 27 dynes/cm.² The reaction product had substantially no free and unreacted diethanol amine.

Example II (A) 200 parts of lauric acid were reacted with 105 parts diethanol amine at a temperature of 150 to 160° C. for 5 to 6 hours. The reaction product was then cooled to 50° C. and found to contain approximately 0.1 mol. of diethanol amine.

(B) 27 parts of lauryl acid sulfate as made in Example I (A) (having a molecular weight of 266) were then added with good stirring. The temperature rose to 60° C. and the reaction was completed in 10 minutes. The reaction product thus formed was soluble in petroleum solvents and vegetable oils and had excellent active interfacial properties.

Example III (A) 117 parts of chlorosulfonic acid were added slowly to 158 parts of technical decyl alcohol. The decyl alcohol was well agitated and cooled with powdered Dry Ice. The temperature was maintained between 15 and 25° C. When the chlorosulfonic addition was completed the reaction product was evacuated at 26 inches of vacuum. The yield of decyl acid sulfate was 238 parts.

(B) 120 parts of decyl acid sulfate as produced under (A) were added slowly with stirring to 250 parts of the product produced under Example I (B) at 40° C. The temperature rose to 76° C. The reaction product was a medium amber semi-viscous liquid on cooling to room temperature. The pH of a water solution of same was 6.9.

Example IV (A) 80 parts of SO₃ were added slowly to 268 parts technical oleyl alcohol dissolved in 268 parts petroleum solvent. The reactants were well stirred and cooled with powdered Dry Ice. The temperature of sulfation was between 20 to 25° C. The yield obtained was 348 parts of oleyl acid sulfate.

(B) 174 parts of the oleyl acid sulfate at 25° C. were added slowly to 250 parts of the product produced under Example I (B) at 40° C. The temperature of the resulting reaction mixture rose to 70° C. On cooling the product was a brown jelly-like mass. This reaction product was completely soluble in many petroleum solvents, both hydrocarbon and aromatic.

(C) 35 parts of the oleyl acid sulfate were added to 266 parts of product prepared in Example II (B).

Example V (A) 202 parts of dodecyl mercaptan were oxidized to dodecyl sulfonic acid. Theoretical yield of 250 parts was obtained.

(B) 200 parts of lauric acid were condensed with 305 parts diethanol amine for 3 hours at 160 to 170° C. A yield of 485 parts of a light amber semi-viscous liquid was obtained on cooling.

(C) 240 parts of dodecyl sulfonic acid as prepared under (A) above were reacted with 240 parts of condensation product as prepared under (B) above. The temperature rose from 25 to 60° C. when the two components were well stirred. The final product had excellent wetting and detergent properties.

*Example VI*

(A) 870 parts of soya bean oil were added to 426 parts of technical triethanol amine. The components were well stirred and heated for 2 hours at 220° C. A yield of 1296 parts of an amber liquid were obtained.

(B) 432 parts of the product as prepared under (A) at 25° C. were reacted with 240 parts dodecyl sulfonic acid at 25° C. The mass was well stirred. The temperature of the reactants rose to 55° C. The product thus obtained had excellent oil emulsifying properties.

(C) 432 parts of the product produced under (A) were reacted with 266 parts of lauryl acid sulfate. When the mass was stirred the temperature rose from 30 to 65° C. The product had similar properties to the product as produced under (B) above.

*Example VII*

(A) 280 parts of oleic acid were reacted with 93 parts monoethanol amine for 7 hours at 150 to 160° C.

(B) 120 parts of isopropyl naphthalene sulfonic acid were added at room temperature to the product as produced under (A) above which was maintained in molten form. The reaction product formed was a viscous mass when hot and solidified on cooling. The product had very good detergent properties.

*Example VIII*

(A) 210 parts of coconut fatty acid were reacted with 405 parts of diethanol amine for 4 hours at 150° C. The reaction product was a light amber colored semi-viscous liquid on cooling. The reaction product was titrated and found to have 300 parts by weight of a basic constituent calculated as unreacted diethanol amine. A yield of 597 parts of reaction product was obtained.

(B) 133 parts of dodecyl acid phosphate were added to 200 parts reaction product prepared according to (A) above. Upon mixing the temperature rose from 25 to 50° C.

(C) 142 parts of oleyl acid pyrophosphate having a mean molecular weight of 426 were added to 200 parts of reaction product prepared according to (A) above. Upon mixing the temperature rose from 30 to 38° C. The reaction product had good foaming and detergent properties.

(D) 396 parts of monolaurin monosulfoacetic acid ester were added to 200 parts of reaction product prepared according to (A) above. Upon mixing the temperature rose from 25 to 50° C. The reaction product obtained had excellent foaming, wetting and detergent properties.

*Example IX*

(A) 180 parts of "amine 175" (polyoxyethylene glycol monoamine sold by Carbide and Carbon Chemicals Corp.) were reacted with 200 parts of lauric acid for 10 hours at 150 to 160° C. The reaction product was tested by titration and was found to have 4 parts of a basic constituent calculated on the basis of a molecular weight of 175 which amounted to approximately 1% by weight of the reaction mixture.

(B) 246 parts of sulfophthalic anhydride were reacted with 315 parts of diethylene glycol monomyristate at 100° C. for 15 minutes. 6 parts of this reaction product were then added to the reaction product prepared under (A) above. The two reaction products were well mixed. The resultant product was a good wetting agent and an excellent detergent.

*Example X*

(A) 263 parts of amine 175 (described under Example IX (A)) were reacted with 280 parts of soya bean oil fatty acids for 9 to 10 hours at a temperature of 165 to 170° C. The reaction product was checked and found to contain just over 11% of a basic constituent calculated as amine 175.

(B) 133 parts of technical oleyl alcohol were mixed with 90 parts of sulfomaleic anhydride. The reaction mixture was heated to 100° C. and held for 15 minutes. The reaction product thus obtained was then mixed with the reaction product prepared under (A) above. The reaction product obtained had excellent emulsifying and detergent properties.

It will be apparent that the hydroxy alkyl amines or alkylolamines which may be employed in the reaction include, in addition to those mentioned in the various examples, primary, secondary and tertiary hydroxy alkylamines or alkylolamines such as the propanolamines, butanolamines, ethanol butanolamines, diethanol butanolamines; alkyl derivatives of hydroxy alkylamines or alkylolamines, that is, hydroxy alkylamines wherein hydrogen attached to nitrogen is replaced by alkyl such as ethyl, methyl, butyl and the like or benzyl, phenyl, ethylphenyl, and the like, as well as mixtures of these and other hydroxy alkylamines; pentanolamine, hexanolamine, cyclohexylethanolamine, isobutanolamine, N-phenyl ethanolamine, laurylolamine, triethanolammoniumhydroxide, also the alkylolamines of glycerine, sugar and other mono- and polyvalent alcohols, and aryl and cycloalkyl alkylolamines.

The higher molecular weight organic acid substances or acylating compounds which are reacted with the hydroxy alkylamines may likewise be selected from a large group including, for example, saturated and unsaturated carboxylic, aliphatic, cycloaliphatic, fatty, and hydroaromatic acids including, for example, lauric acid, palmitic acid, myristic acid, linoleic acid, oleic acid, stearic acid, monoglycerides or other esters of said acids with polyhydroxy alcohols, abietic acid, benzoic acid as well as other derivatives of such acids, as, for example, the halides such as benzoyl chloride, stearic acid chloride and the like. Of particular usefulness are the high molecular weight fatty acids which are derived from oils and fats of animal and vegetable origin and which may be denoted as vegetal fatty acids. It will be understood, of course, that mixtures of these as well as other high organic acids or high organic acid substances or acylating compounds may be employed and that such may be condensed with either substantially pure hydroxy alkylamines or mixtures thereof such as may be found, for example, in commercial products. I may also use amides of fatty acids, and their alkylol derivatives. As a source of fatty acids, I may also employ acid anhydrides. In general, any organic acid derivative containing a —CO— group may be used. I can also use fats as a source of fatty acid, in which case glycerine or other alcohol forming the fatty ester splits off during the condensation. In place of the fats, I may also use sulfuric acid esters of fats, like sulfonated castor oil, as well as the substitution products thereof such as the halogenous substitution products, for example, chlorinated olein.

I may use mixed fatty acids derived from coconut, palm kernel, palm oils, soya beans, linseed, olive, rapeseed, cottonseed, peanut and castor oil which contain unsaturated fatty or unsaturated hydroxy fatty acids. The following may also be used: mixed fatty acid derived from tallow, fish, or seal oils, whale or shark oils and hydrogenated acids of the said sources; synthetic high molecular fatty acids, obtainable by oxidation of paraffin wax and similar higher molecular hydrocarbons; resinic acids, such as abietic acid, naphthenic acids and long-chain fatty acids having an aromatic hydrocarbon radical directly connected to an aromatic chain; long-chain di- or polycarboxylic acids, for example, dimerized oleic or trimerized fatty acids wherein the bonding between the original monomeric fatty acids is from carbon atom to carbon atom on the respective hydrocarbon chains.

In addition to or in place of the organic acid substances or acylating compounds previously designated, I may also use directly any of the esters or mixtures thereof from which the aforementioned organic acids are derived, for example, coconut oil, cottonseed oil, corn oil, soya bean oil, castor oil, peanut oil, lard oil, tallow, fish or marine oils, tall oils derived from the sulfate paper pulp process, vegetable ester waxes, beeswax, spermaceti, and the like. These esters may also be used directly or may be hydrogenated or suitably substituted with other substituents.

There are many suitable polybasic acids having at least one hydrogen substituted by a hydrophobic organic radical and having at least one free acidic hydrogen which can be used in my invention. These acids are made by reacting selected inorganic polybasic acids with selected organic compounds. The following are suitable inorganic acids which can be used: sulfuric acid, sulfonic acid, boric acid, phosphoric acid and polyphosphoric acid. The following are suitable organic compounds for reacting with the aforesaid acids: lauryl alcohol; butyloctyl alcohol; oleyl alcohol; secondary octyl alcohol; secondary dodecyl alcohol; secondary tetradecyl alcohol; secondary octadecyl alcohol; alcohols obtained by catalytic hydrogenation of the free fatty acids of coconut oil and comprising mainly lauric alcohol, myristic alcohol, cetyl alcohol, and stearic alcohol or the single alcohols separated from each other by fractional distillation; alcohols obtained by catalytic hydrogenation of palm kernel oil or of the free fatty acids of palm kernel oil comprising similar constituents as the alcohols obtained from coconut oil; alcohols obtained by seponification of spermaceti sperm oil, beeswax and distillation according to Axelrad and Hochstadter (U. S. Patent 1,290,870); linoleic alcohol obtained by reduction of linoleic acid by means of sodium and ethyl alcohol; alcohols obtained by catalytic reduction of tallow or the free fatty acids of tallow; alcohols obtained by catalytic hydrogenation of the free fatty acids of coconut oil; alcohols obtained by catalytic hydrogenation of the free fatty acids of palm kernel oil; alcohols obtained by reducing olive oil by means of metallic sodium and butyl alcohol; alcohols obtained by reducing the ethyl esters of tallow fatty acids by means of metallic sodium and butyl alcohol; alcohols obtained by catalytic hydrogenation of the ethyl ester of commercial stearic acid; ricinoleic alcohol obtained by reduction of ricinoleic acid by means of sodium and ethyl alcohol. The foregoing compounds can be designated generally by the formula R—O—X—H wherin R is any hydrophobic hydrocarbon group such as alkyl, alkaryl, aryl, cyclic or their substituted derivatives, X is any one of the aforesaid inorganic acid radicals, H is acidic hydrogen and O is oxygen. For example, when sulfuric acid is reacted with lauryl alcohol the reaction product is lauryl acid sulfate. When oleyl alcohol is reacted with polyphosphoric acid the product is oleyl acid polyphosphate.

I may also react the aforesaid inorganic acids with other compounds having the general formula R—X—H where R is any hydrophobic hydrocarbon group such as alkyl, alkaryl, aryl, cyclic or their substituted derivatives, X is any one of the aforesaid inorganic acid radicals and H is acidic hydrogen, as for example, dodecyl sulfonic acid, oleyl sulfonic acid, octyl benzene sulfonic acid, isopropyl naphthalene sulfonic acid, and alkyl phosphinic acids.

I may also react the aforesaid inorganic acids with compounds, such as lauryl acetate, octyl propionate, octyl butyrate, myristyl succinate, oleyl maleate, 2-ethylhexyl benzoate, decyl phthalate, dioctyl phthalate, monostearine monoacetate, monolein monobenzoate, diethylene glycol monolaurate monophthalate and dodecyl glycerolether monoacetate, to produce compounds having the general formula R—Z—X—H wherein R is any hydrophobic hydrocarbon group such as alkyl, alkaryl, aryl, cyclic or their substituted derivatives, Z is an oxygenated hydrocarbon group having acylating, ether-forming or both ether-forming and acylating functions, X is any one of the aforesaid inorganic acid radicals and H is acidic hydrogen. For example, when lauryl acetate is reacted with a sulfonic acid lauryl sulfoacetate is produced. Also when decyl phthalate is reacted with a sulfonating acid the product is decyl sulfophthalate.

In carrying out my process, it is essential to react the higher fatty acylating compound with the alkylolamine under such conditions that after the reaction occurs the reaction mixture contains at least 1% by weight of a basic component as determined by titration and calculated on the basis of the initial alkylolamine used. The latter reacts with the added polybasic acid of the character previously described. I have also found that the said basic component may be present up to about 50% by weight of the said reaction mixture for producing satisfactory surface active products. The amount of the said basic component formed in the reaction mixture can be predetermined by adjusting the proportions of the reacting substances as well as controlling the reaction conditions such as reacting time and temperature. When it is desired to produce a final surface active product which is readily soluble in water, I adjust the above-named factors so as to produce preferably an amount of the said basic component from 15 to about 50% by weight of the reaction mixture. On the other hand, when it is desired to produce a final interface modifying product which is oil soluble and also more effective in an oil medium, I adjust the previously mentioned factors so as to produce the said basic constituent in amount of 1 to about 15% by weight of the reaction mixture. It is therefore apparent that I may produce a final product which has interface active properties either effective solely in water or solely in oil or equally effective in either oil or water phases. In order to obtain the desired interface modifying characteristics of a product besides controlling the aforementioned reaction factors, I may use suitable selected reactants or mixture of each of the necessary reactants to obtain the desired product. Obviously, numerous processes can be followed within the teachings of the invention herein disclosed, all of which can be readily determined by one skilled in the art. All such modifications and variations are intended to be included in the appended claims.

I claim:

1. The reaction product of a mixture containing at least 1% by weight of a basic component produced by reacting a hydroxy alkyl amine with a higher fatty acylating compound, said mixture being reacted with a polybasic acid having at least one hydrogen substituted by a hydrophobic organic radical and having at least one free acid hydrogen.

2. The reaction product of a mixture containing at least 1% by weight of a basic component produced by reacting a hydroxy alkyl amine with a higher fatty aclating compound, said mixture being reacted with a polybasic acid of the formula R—O—X—H, wherein R is a hydrophobic hydrocarbon group, O is oxygen, X is an inorganic acid radical selected from the group consisting of sulfuric, sulphonic, boric, phosphoric and polyphosphoric acid, and H is acidic hydrogen.

3. The reaction product of a mixture containing at least 1% by weight of a basic component produced by reacting a hydroxy alkyl amine with a higher fatty acylating compound, said mixture being reacted with a polybasic acid of the formula R—X—H, wherein R is a hydrophobic hydrocarbon group, X is an inorganic acid radical selected from the group consisting of sulfuric, sulphonic, boric, phosphoric and polyphosphoric acid, and H is acidic hydrogen.

4. The reaction product of a mixture containing at least 1% by weight of a basic component produced by reacting a hydroxy alkyl amine with a higher fatty acylating compound, said mixture being reacted with a polybasic acid of the formula R—Z—X—H, wherein R is a hydrophobic hydrocarbon group, Z is an oxygenated hydrocarbon group having acylating, ether-forming or both ether-forming and acylating functions, X is an inorganic acid radical selected from the group consisting of sulfuric, sulphonic, boric, phosphoric and polyphosphoric acid, and H is acidic hydrogen.

5. The reaction product of a mixture containing at least 1% by weight of a basic component produced by reacting a hydroxy alkyl amine selected from the group consisting of monoethanolamine, diethanolamine, triethanolamine, isopropanolamines and mixtures thereof with a higher fatty acylating compound, said mixture being reacted with a polybasic acid having at least one hydrogen substituted by a hydrophobic organic radical and having at least one free acid hydrogen.

6. The reaction product of a mixture containing at least 1% by weight of a basic component produced by reacting a hydroxy alkyl amine with a higher fatty acid selected from the group consisting of stearic acid, oleic acid, lauric acid, myristic, linoleic, ricinoleic, coconut oil fatty acids, soya bean oil fatty acids, cottonseed oil fatty acids, and mixtures thereof, said mixture being reacted with a polybasic acid having at least one hydrogen substituted by a hydrophobic organic radical and having at least one free acid hydrogen.

7. The reaction product of a mixture containing at least 1% by weight of a basic component produced by reacting a hydroxy alkyl amine with a higher fatty acylating compound, said mixture being reacted with the sulfuric acid reaction product derived from lauryl, myristyl, palmityl, stearyl and oleyl alcohols.

8. The reaction product of a mixture containing at least 1% by weight of a basic component produced by reacting a hydroxy alkyl amine with a higher fatty acid, said mixture being reacted with a polybasic acid having at least one hydrogen substituted by a hydrophobic organic radical and having at least one free acid hydrogen.

9. The reaction product of a mixture containing at least 1% by weight of a basic component produced by reacting a hydroxy alkyl amine with a member of the group consisting of higher fatty acids, their triglycerides, esters, amides, anhydrides, and halides, said mixture being reacted with a polybasic acid having at least one hydrogen substituted by a hydrophobic organic radical and having at least one free acid hydrogen.

10. The reaction product of a mixture containing at least 1% by weight of a basic component produced by reacting a hydroxy alkyl amine with a higher fatty acylating compound selected from the group consisting of coconut oil, castor oil, cottonseed oil, corn oil, lard oil, tallow, fish oil, and tall oils, said mixture being reacted with a polybasic acid having at least one hydrogen substituted by a hydrophobic organic radical and having at least one free acid hydrogen.

11. The process of producing a composition having interface modifying properties which comprises reacting a higher fatty acylating compound with a hydroxy alkyl amine to form a reaction mixture containing at least 1% by weight of a basic component, and then adding to the reaction mixture a polybasic acid having at least one hydrogen substituted by a hydrophobic organic radical and having at least one free acid hydrogen.

12. The process of producing a composition having interface modifying properties which comprises reacting a higher fatty acylating compound with a hydroxy alkyl amine to form a reaction mixture containing at least 1% by weight of a basic component, and then adding to the reaction mixture a polybasic acid of the formula R—O—X—H, wherein R is a hydrophobic hydrocarbon group, O is oxygen, X is an inorganic acid radical selected from the group consisting of sulfuric, sulphonic, boric, phosphoric and polyphosphoric acid, and H is acidic hydrogen.

13. The process of producing a composition having interface modifying properties which comprises reacting a higher fatty acylating compound with a hydroxy alkyl amine to form a reaction mixture containing at least 1% by weight of a basic component, and then adding to the reaction mixture a polybasic acid of the formula R—X—H, wherein R is a hydrophobic hydrocarbon group, X is an inorganic acid radical selected from the group consisting of sulfuric, sulphonic, boric, phosphoric and polyphosphoric acid, and H is acidic hydrogen.

14. The process of producing a composition having interface modifying properties which comprises reacting a higher fatty acylating compound with a hydroxy alkyl amine to form a reaction mixture containing at least 1% by weight of a basic component, and then adding to the reaction mixture a polybasic acid of the formula R—Z—X—H, wherein R is a hydrophobic hydrocarbon group, Z is an oxygenated hydrocarbon group having acylating, ether-forming or both ether-forming and acylating functions, X is an inorganic acid radical selected from the group consisting of sulfuric, sulphonic, boric, phosphoric and polyphosphoric acid, and H is acidic hydrogen.

15. The process of producing a composition having interface modifying properties which comprises reacting a hydroxy alkyl amine with a higher fatty acid selected from the group consisting of stearic acid, oleic acid, lauric acid, myristic, linoleic, ricinoleic, coconut oil fatty acids, soya bean oil fatty acids, cottonseed oil fatty acids or mixtures thereof, to form a reaction mixture containing at least 1% by weight of a basic component, and then adding to the reaction mixture a polybasic acid having at least one hydrogen substituted by a hydrophobic organic radical and having at least one free acid hydrogen.

16. The process of producing a composition having interface modifying properties which comprises reacting a higher fatty acylating compound with a hydroxy alkyl amine selected from the group consisting of monoethanolamine, diethanolamine, triethanolamine, isopropylanolamines, and mixtures thereof, to form a reaction mixture containing at least 1% by weight of a basic component, and then adding to the reaction mixture a polybasic acid having at least one hydrogen substituted by a hydrophobic organic radical and having at least one free acid hydrogen.

17. The process of producing a composition having interface modifying properties which comprises reacting a higher fatty acylating compound with a hydroxy alkyl amine to form a reaction mixture containing at least 1% by weight of a basic component, and then adding to the reaction mixture the reaction product of an alcohol and a polybasic acid selected from the group consisting of sulfuric acid, boric acid, phosphoric acid and polyphosphoric acid.

18. The process of producing a composition having interface modifying properties which comprises reacting a higher fatty acid with a hydroxy alkyl amine to form a reaction mixture containing at least 1% by weight of a basic component, and then adding to the reaction mixture a polybasic acid having at least one hydrogen substituted by a hydrophobic organic radical and having at least one free acid hydrogen.

19. The process of producing a composition having interface modifying properties which comprises reacting a hydroxy alkyl amine with an acylating compound selected from the group consisting of higher fatty acids, their triglycerides, esters, amides, anhydrides and halides to form a reaction mixture containing at least 1% by weight of a basic component, and then adding to the reaction mixture a polybasic acid having at least one hydrogen substituted by a hydrophobic organic radical and having at least one free acid hydrogen.

MORRIS KATZMAN.

REFERENCES CITED

The following references are of record in the file of this patent:

UNITED STATES PATENTS

| Number | Name | Date |
|---|---|---|
| 1,932,180 | Guenther et al. | Oct. 24, 1933 |
| 2,089,212 | Kritchevsky | Aug. 10, 1937 |